(12) United States Patent
Han

(10) Patent No.: US 7,724,614 B2
(45) Date of Patent: May 25, 2010

(54) OPTICAL PICKUP ACTUATOR

(75) Inventor: Jeong Yeop Han, Suwon-si (KR)

(73) Assignee: LG Electronics Inc., Seoul (KR)

( * ) Notice: Subject to any disclaimer, the term of this patent is extended or adjusted under 35 U.S.C. 154(b) by 950 days.

(21) Appl. No.: 11/154,809

(22) Filed: Jun. 17, 2005

(65) Prior Publication Data

US 2005/0286356 A1    Dec. 29, 2005

(30) Foreign Application Priority Data

| Jun. 25, 2004 | (KR) | ...................... 10-2004-0047976 |
| Aug. 20, 2004 | (KR) | ...................... 10-2004-0065738 |
| Aug. 20, 2004 | (KR) | ...................... 10-2004-0065739 |

(51) Int. Cl.
*G11B 7/00* (2006.01)

(52) U.S. Cl. .................................. 369/44.11

(58) Field of Classification Search ........................ None
See application file for complete search history.

(56) References Cited

U.S. PATENT DOCUMENTS

| 5,708,633 | A | * | 1/1998 | Hollen et al. ............ 369/44.11 |
| 5,905,255 | A | * | 5/1999 | Wakabayashi et al. ... 250/201.5 |
| 7,028,318 | B2 | * | 4/2006 | Tajiri ......................... 720/684 |
| 7,194,749 | B2 | * | 3/2007 | Hatazawa ................... 720/683 |
| 7,453,656 | B2 | * | 11/2008 | Jang et al. .................. 359/819 |
| 2003/0117909 | A1 | * | 6/2003 | Kawano ................ 369/44.16 |

FOREIGN PATENT DOCUMENTS

| EP | 1 271 494 A2 | 1/2003 |
| EP | 1 355 301 A2 | 10/2003 |
| EP | 1 369 854 A2 | 12/2003 |
| JP | 2004-110971 | 4/2004 |

OTHER PUBLICATIONS

European Search Report dated Jun. 30, 2006.

* cited by examiner

*Primary Examiner*—Joseph H Feild
*Assistant Examiner*—Joseph Haley
(74) *Attorney, Agent, or Firm*—KED & Associates, LLP

(57) ABSTRACT

Provided is an optical pickup actuator. The optical pickup actuator includes: a lens holder for holding an object lens; a focusing coil disposed at the lens holder; a tracking coil disposed at the lens holder; a radial coil wound at a coil holder at which the focusing coil is wound; and multipolar magnets disposed at positions facing the focusing coil, the tracking coil, and the radial coil.

17 Claims, 17 Drawing Sheets

⇧ Focusing Force Direction

--→ Current Flow Direction

⤴ { Tilting Force Direction
Tilt Moment Direction }

⇨ Tracking Force Direction
⇧ Focusing Force Direction
--→ Current Flow Direction --→ Current Flow Direction

OPTICAL PICKUP ACTUATOR

BACKGROUND OF THE INVENTION

1. Field of the Invention

The present invention relates to an optical pickup actuator for improving a coil winding structure of a lens holder.

2. Description of the Background Art

Optical pickup actuator refers to a device for recording information or reproducing the recorded information following an optical recording medium. The optical pickup actuator constantly maintains a relative position between an objective lens and the optical recording medium by moving a lens holder for holding the objective lens.

FIGS. 1 to 3 are views illustrating a conventional optical pickup actuator.

The optical pickup actuator 100 includes a lens holder 102 for holding an objective lens at its center; and a magnetic circuit disposed at one side of the lens holder 102 and activating the lens holder 102.

The magnetic circuit includes focusing coils 104, tracking coils 105, a yoke 107, and multipolar magnets 110a to 110d.

The focusing coils 104 are disposed at the left and right of both side surfaces of the lens holder 102 to perform focusing operations. The focusing coil 104 is positioned to face a horizontal boundary 111 between magnets having different polarities.

The tracking coils 105 are disposed at the centers of both side surfaces of the lens holder 102 to perform tracking operations. The tracking coil 105 is positioned to face a vertical boundary 112 between magnets having different polarities.

The radial coil 103 is disposed at an upper side of the lens holder 102 to perform a radial tilting operation. The radial coil 103 is disposed at a circumference surface of the lens holder 102. A portion of the radial coil 103 is positioned to face the vertical boundary 112 between the magnets having the different polarities.

The multipolar magnets are comprised of rectangular magnets 110c and 110d disposed at their lower sides, and rectangular magnets 110a and 110b disposed at upper sides of and between the magnets 110c and 110d.

The magnets 110a to 110d are respectively fixed to an inner surface of the yoke 107, which is formed of ferromagnetic substance and disposed adjacently to the lens holder 102. The yoke 107 functions as a path for magnetic fields generated from the magnets 110a to 110d.

Wire suspensions 106 are fixed at their one ends to both side surfaces of the lens holder 102, and fixed at their other ends to a frame provided at one side of the lens holder 102. The wire suspension 106 supports the lens holder 102, and supplies electric current.

An operation of the optical pickup actuator 100 will be described as follows.

When electric current flows through the focusing coil 104, the focusing coil 104 is interacted with the magnetic field generated from the horizontal boundary 111 between the facing magnets and is vertically forced due to the interaction, thereby activating a focusing servo.

When the electric current flows through the tracking coil 105, the tracking coil 105 is interacted with the magnetic field generated from the vertical boundary 112 between the facing magnets and is horizontally forced due to the interaction, thereby activating a tracking servo.

When the electric current flows through the radial coil 103, the radial coil 103 is interacted with the magnetic field generated from the horizontal boundary 111 between the facing magnets and is forced upward and downward due to the interaction, thereby performing the radial tilting operation.

As shown in FIG. 2, the radial tilting operation refers to the operation of forcing the lens holder 102 upward at one side and downward at the other side, thereby rotating the lens holder 102.

In the optical pickup actuator 100, the lens holder 102 is moved using an interaction between the magnet and the coil, thereby minimizing error of a light signal.

However, the conventional optical pickup actuator 100 has a drawback in that it requires a structure for winding the radial coil 103 on the lens holder 102, and a separate process for winding the radial coil 103.

SUMMARY OF THE INVENTION

Accordingly, an object of the present invention is to solve at least the problems and disadvantages of the background art.

An object of the present invention is to provide an optical pickup actuator for forming a radial coil at a lens holder without a separate structure for winding the radial coil.

Another object of the present invention is to provide an optical pickup actuator for freely selecting a winding position and type of a radial coil.

A further another object of the present invention is to provide an optical pickup actuator for facilitating a process of winding a radial coil.

To achieve these and other advantages and in accordance with the purpose of the present invention, as embodied and broadly described, there is provided an optical pickup actuator including: a lens holder for holding an object lens; a focusing coil disposed at the lens holder; a tracking coil disposed at the lens holder; a radial coil wound at a coil holder at which the focusing coil is wound; and multipolar magnets disposed at positions facing the focusing coil, the tracking coil, and the radial coil.

In another aspect of the present invention, there is provided an optical pickup actuator including: a lens holder for holding an objective lens; multipolar magnets disposed adjacently to the lens holder; a focusing coil wound on the lens holder, and facing a horizontal boundary between the multipolar magnets and vertically forced depending on applied electric current; a tracking coil wound on the lens holder, and facing a vertical boundary between the multipolar magnets and horizontally forced depending on the applied electric current; and a radial coil wound on the lens holder, and facing a horizontal boundary between the multipolar magnets and forced upward at one side and downward at the other side depending the applied electric current.

In a further another aspect of the present invention, there is provided an optical pickup actuator including: a lens holder for holding an objective lens; a focusing coil disposed at the lens holder, and performing a focusing operation; a tracking coil disposed at the lens holder, and performing a tracking operation; a radial coil having at least one part adhered to the focusing coil, and performing a radial tilting operation; and multipolar magnets disposed at positions facing the focusing coil, the tracking coil, and the radial coil.

In a still another aspect of the present invention, there is provided an optical pickup actuator including: a lens holder for holding an objective lens; focusing coils respectively disposed at both side surfaces of the lens holder, and performing a focusing operation depending applied electric current; tracking coils respectively disposed at the both side surfaces of the lens holder, and performing a tracking operation depending the applied electric current; radial coils respectively disposed at the both side surfaces of the lens holder, and performing a radial tilting operation depending the applied electric current; and multipolar magnets disposed at positions facing the focusing coil, the tracking coil, and the radial coil.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Figure 1:
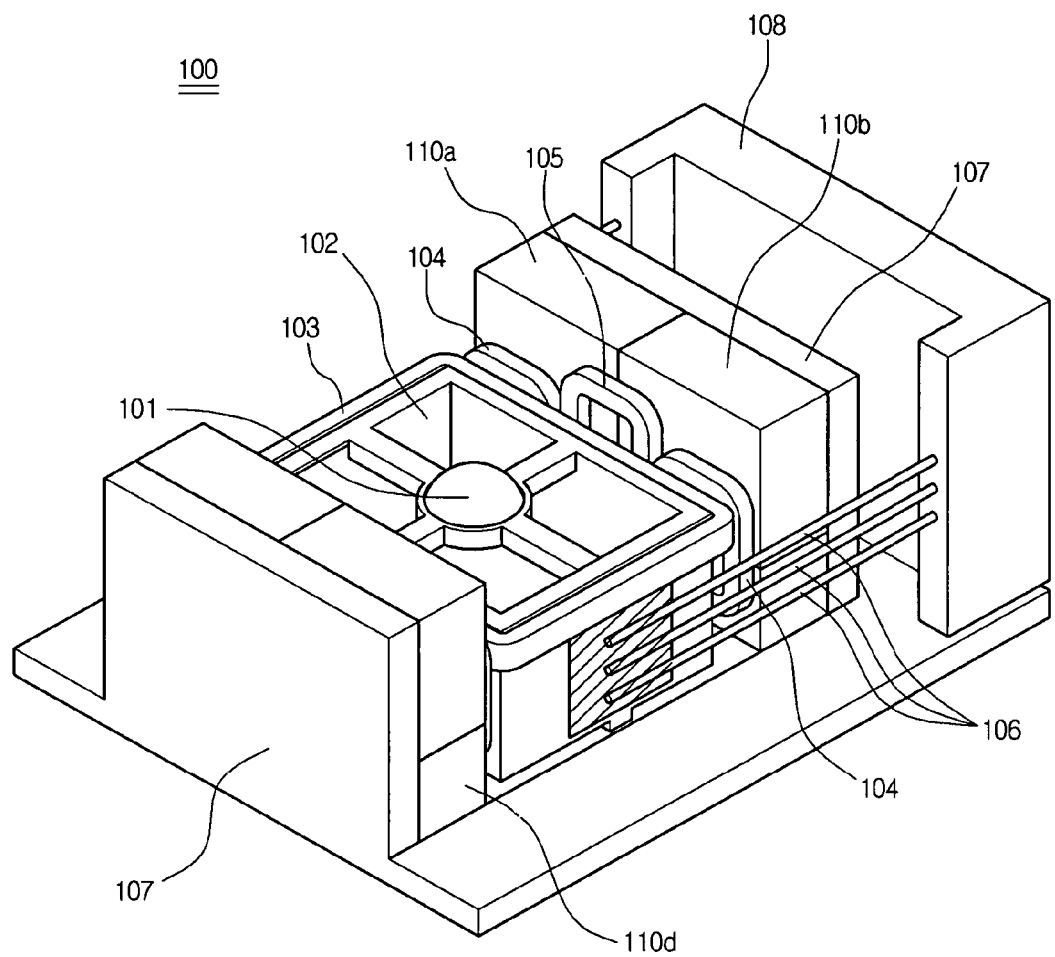
FIGS. 1 to 3 are views illustrating a conventional optical pickup actuator.
Figure 2:
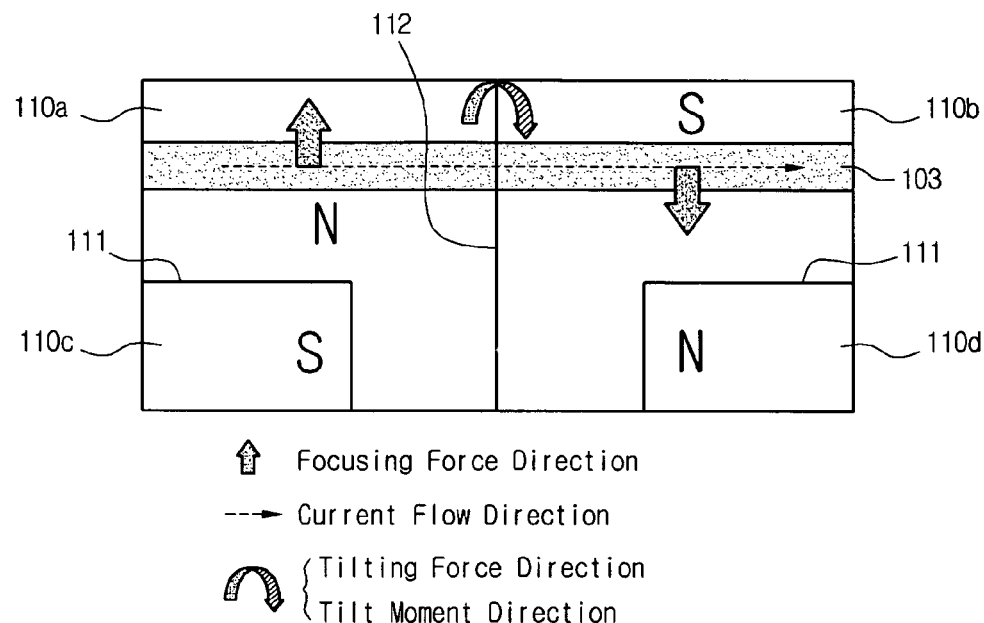
Figure 3:
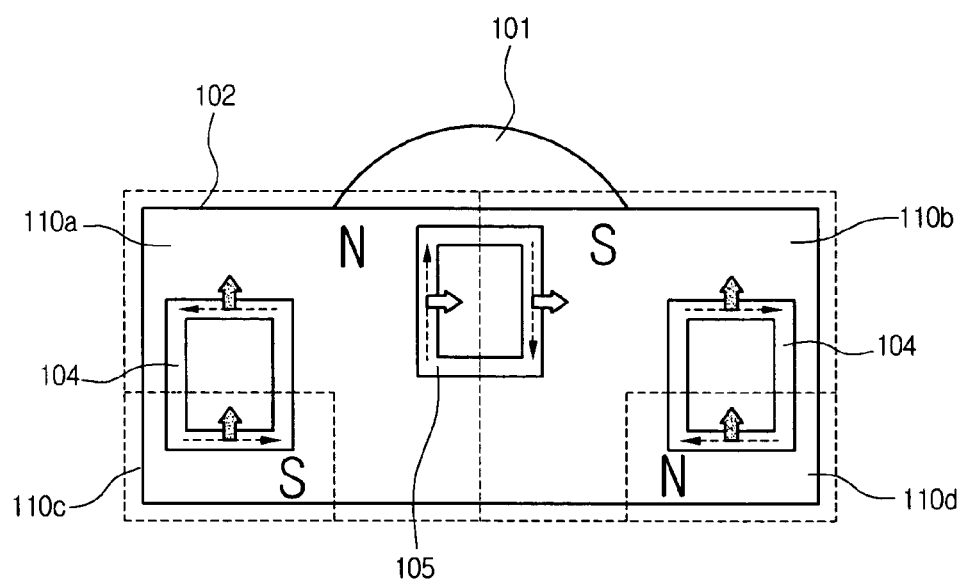
Figure 4:
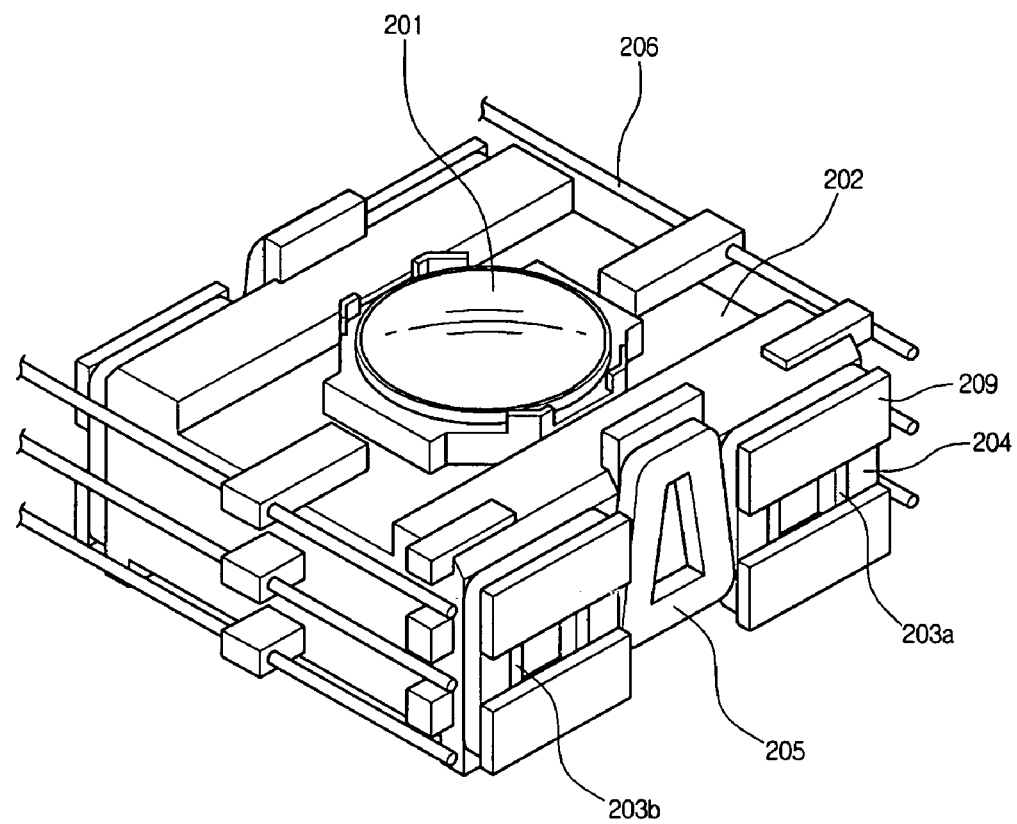
FIGS. 4 to 7 are views illustrating an optical pickup actuator according to the first embodiment of the present invention.
Figure 5:
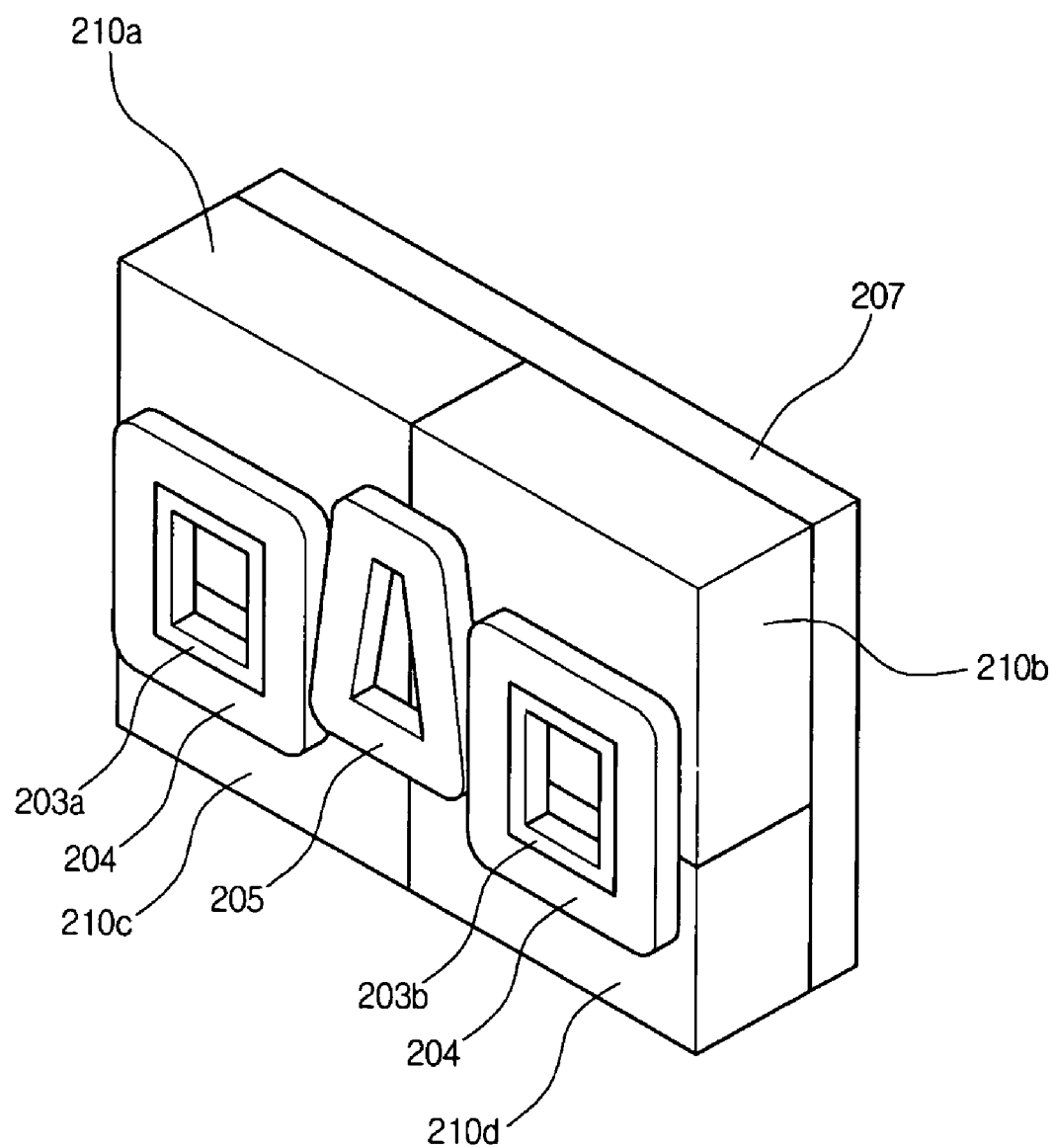
Figure 6:
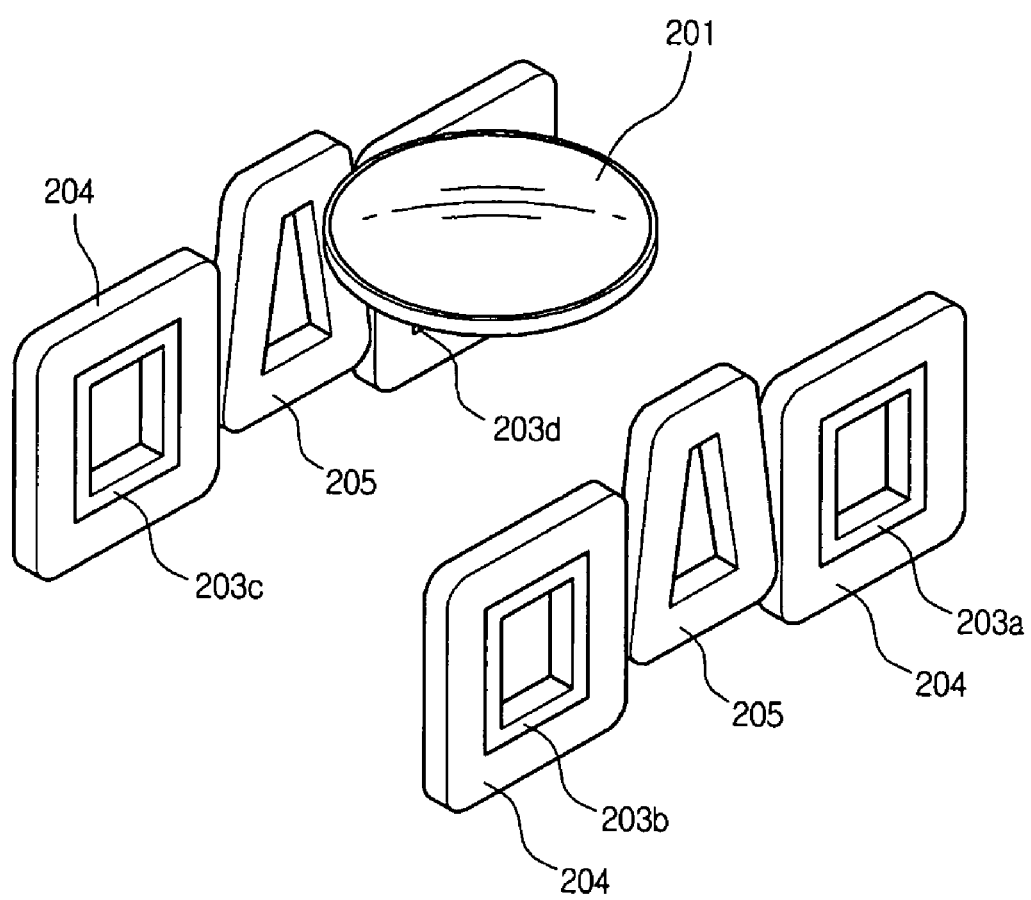

Preferred embodiments of the present invention will be described in a more detailed manner with reference to the drawings.

FIGS. 4 to 7 are views illustrating an optical pickup actuator according to the first embodiment of the present invention.

The optical pickup actuator includes a lens holder 202 for holding an objective lens 201. The lens holder 202 is supported by a wire suspension 206. The wire suspension 206 not only supports the lens holder 202, but also supplies electric current to activate the optical pickup actuator.

Focusing coils 204, tracking coils 205 and radial coils 203a to 203d are disposed at both side surfaces of the lens holder 202.

The focusing coils 204 are disposed at the left and right of the both side surfaces of the lens holder 202, and the tracking coils 205 are disposed at centers of the both side surfaces of the lens holder 202.

The radial coils 203a to 203d are adhered at inner sides of the focusing coils 204.

First, the radial coils 203a to 203d can be wound on the coil holders 209, and then the focusing coils 204 can be wound on the radial coils 203a to 203d wound on the coil holders 209, to form the radial coils 203a to 203d together with the focusing coils 204.

In other words, the radial coils 203a to 203d are wound on the coil holders 209 having the focusing coil 204 wound thereon.

As such, in the inventive optical pickup actuator, the radial coils 203a to 203d are wound on the coil holders 209 together with the focusing coil 204, thereby not requiring a separate fixed structure for winding the radial coils 203a to 203d on the lens holder 202.

The focusing coils 204 and the radial coils 203a to 203d are positioned to face horizontal boundaries 211 between magnets having different polarities, and the tracking coil 205 is positioned to face a vertical boundary 212 between magnets having different polarities.

The magnets are comprised of rectangular magnets 210c and 210d disposed at their lower sides, and rectangular magnets 210a and 210b disposed at upper sides of and between the rectangular magnets 210c and 210d. The magnets 210a to 210d are respectively fixed to an inner surface of a yoke 207, which is formed of ferromagnetic substance and disposed adjacently to the lens holder 202. The yoke 207 provides a path for magnetic fields generated from the magnets 210a to 210d.

The radial coils 203a to 203d can be wound in various manners for a radial tilting operation.

In one example, the radial coils 203a and the 203b are connected in parallel, and the radial coils 203c and 203d are also connected in parallel. The radial coils 203a and 203d are connected in series, and the radial coils 203b and 203c are also connected in series.

In another example, each of the radial coils 203a to 203d can be independently wound to perform the radial tilting operation by controlling the direction of electric current.

In a further another example, the radial coils 203a to 203d can be wound in different directions to perform the radial tilting operation.

Figure 7:
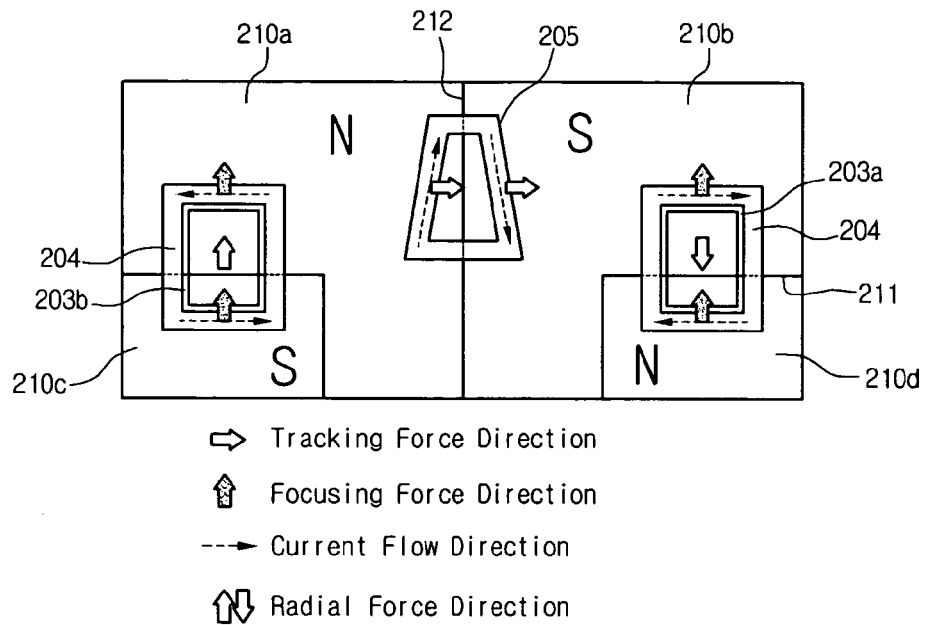

Due to the radial tilting operation of the radial coils 203a to 203d, the lens holder 202 is forced downward at one side and upward at the other side as shown in FIG. 7.

In other words, the both sides of the lens holder 202 are respectively forced in opposite directions so that the radial coils 203a to 203d can perform the radial tilting operation.

An operation of the optical pickup actuator will be described as follows.

First, when the electric current flows through the focusing coil 204, the focusing coil 204 is interacted with a magnetic field generated from the horizontal boundary 211 between the facing magnets and is vertically forced due to the interaction, thereby activating a focusing servo.

When electric current flows through the tracking coil 205, the tracking coil 205 is interacted with a magnetic field generated from the vertical boundary 212 between the facing magnets and is horizontally forced due to the interaction, thereby activating a tracking servo.

When electric current flows through the radial coils 203a to 203d, the radial coils 203a to 203d are interacted with the magnetic field generated from the horizontal boundary 211 between the facing magnets and are forced upward and downward due to the interaction, thereby performing the radial tilting operation.

By the parallel connection, the direction of the applied electric current, and the winding direction of the radial coils 203a to 203d, the radial coils 203b and 203c and the radial coils 203a and 203d are forced in different directions, respectively.

For example, in FIG. 7, when the electric current counterclockwise flows through the radial coils 203a and 203b, the radial coil 203a is forced downward and the radial coil 203b is forced upward due to opposite magnetic poles of the magnets disposed at upper and lower positions of the horizontal boundary 211.

Accordingly, the radial tilting operation of the radial coils 203a to 203d can be smoothly performed.

In the following optical pickup actuators according to other embodiments of the present invention, a type of a radial coil will be concentratively described, and a detailed description of other constituent elements will be omitted.

Figure 8:
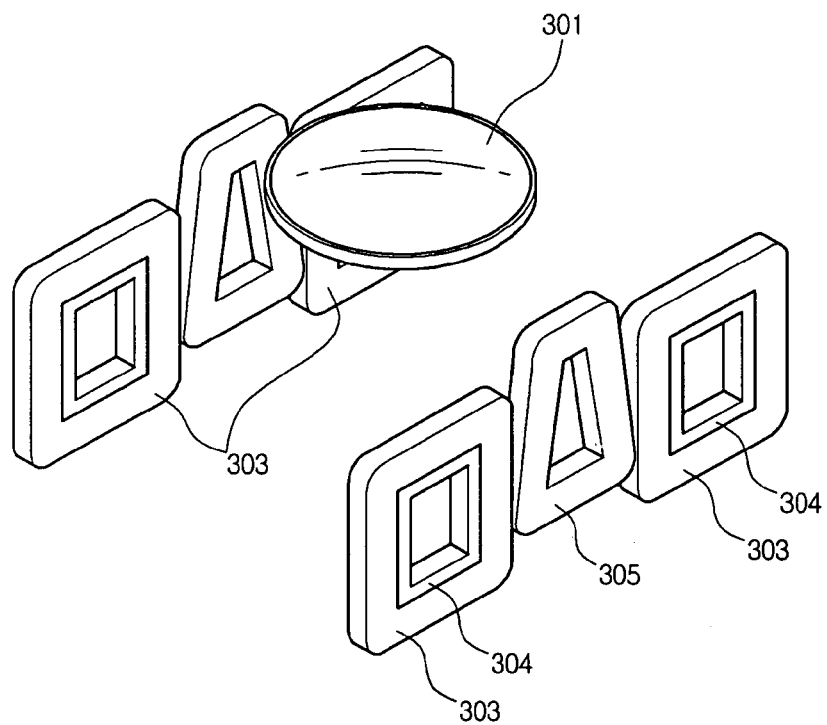
FIGS. 8 and 9 are views illustrating an optical pickup actuator according to the second embodiment of the present invention.
Figure 9:
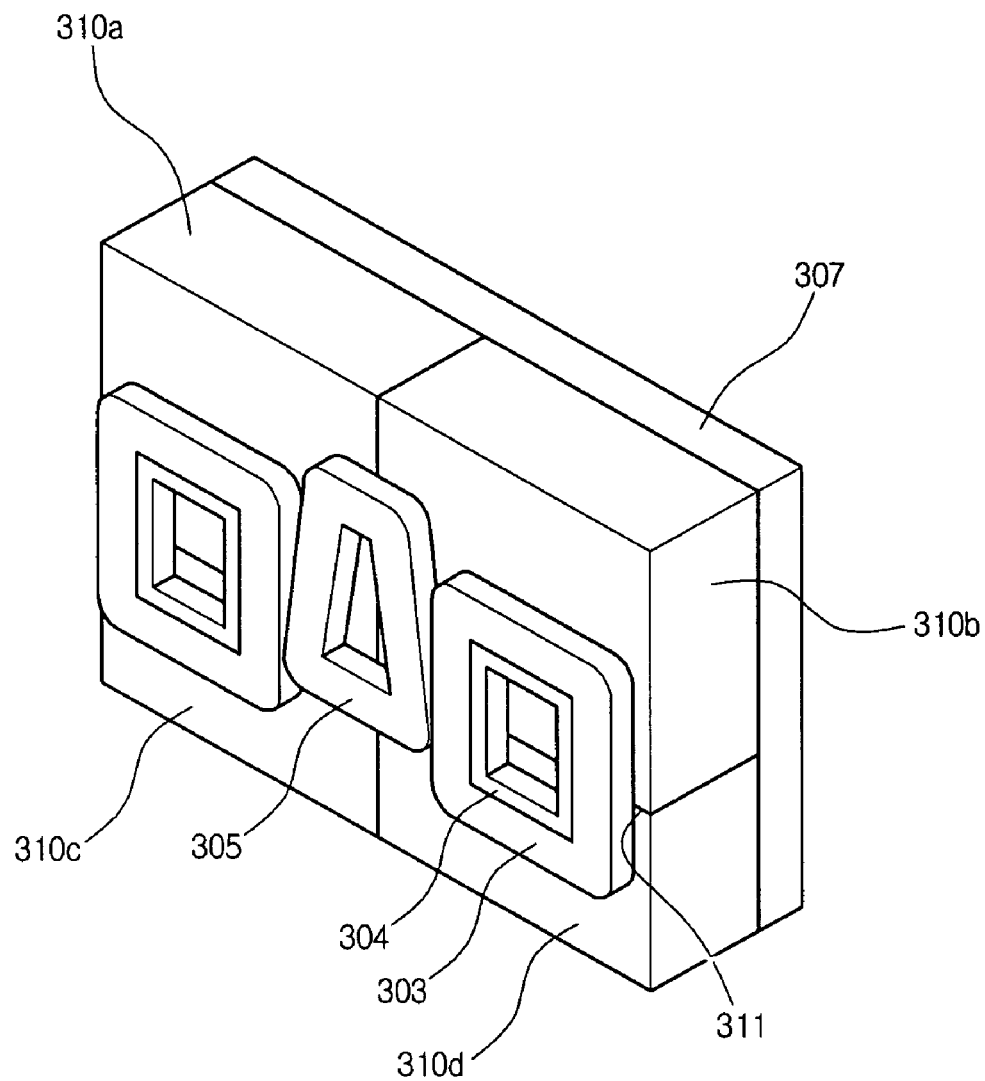
Figure 10:
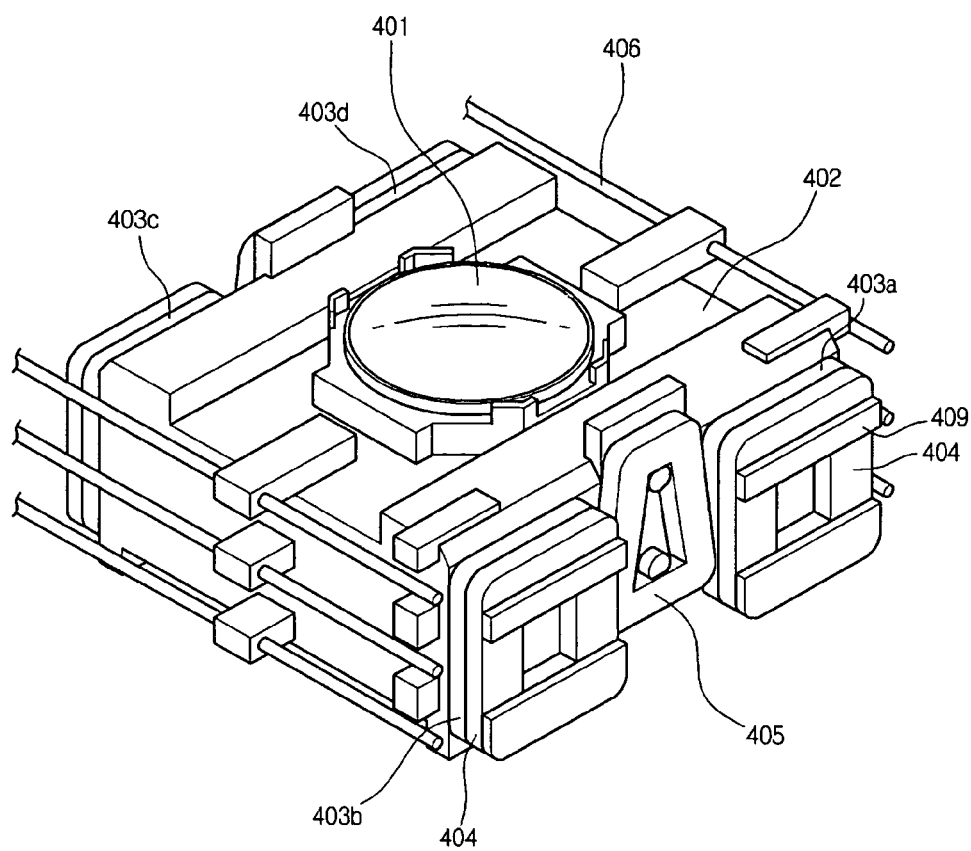
FIGS. 10 to 14 are views illustrating an optical pickup actuator according to the third embodiment of the present invention.
Figure 11:
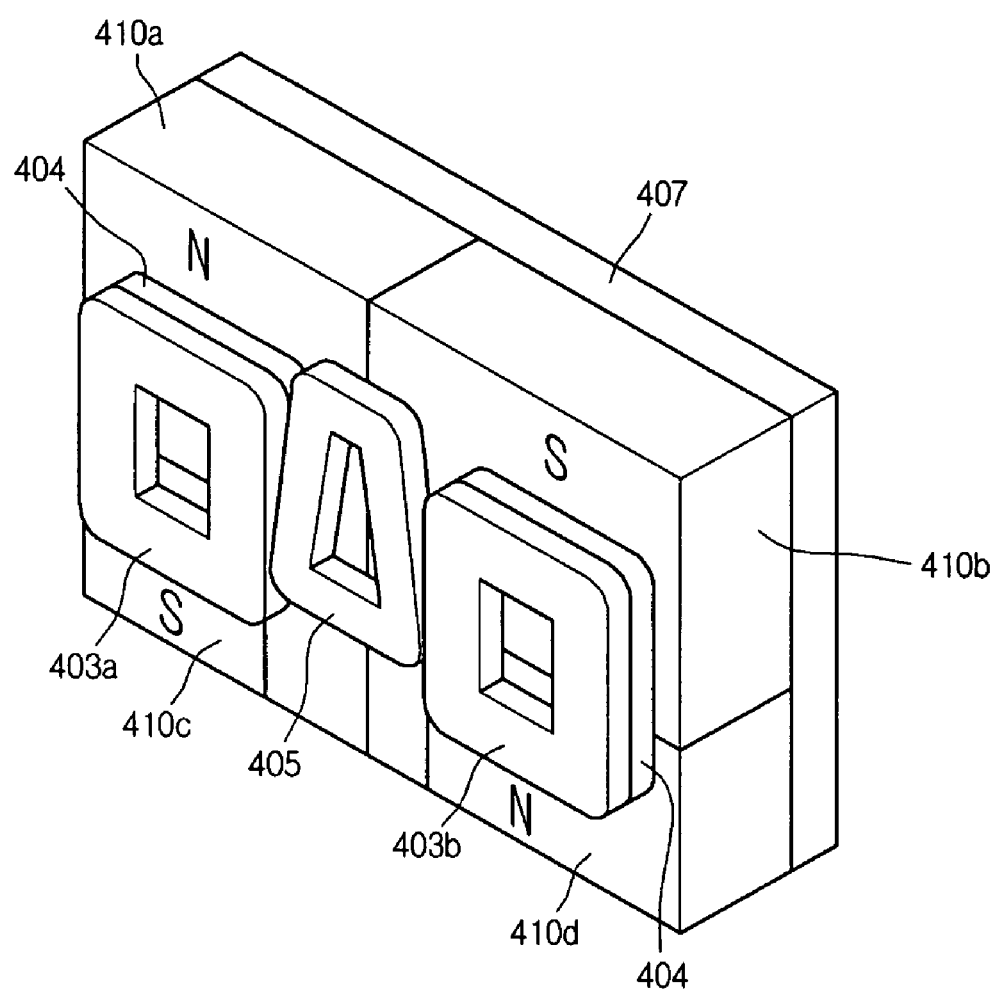
Figure 12:
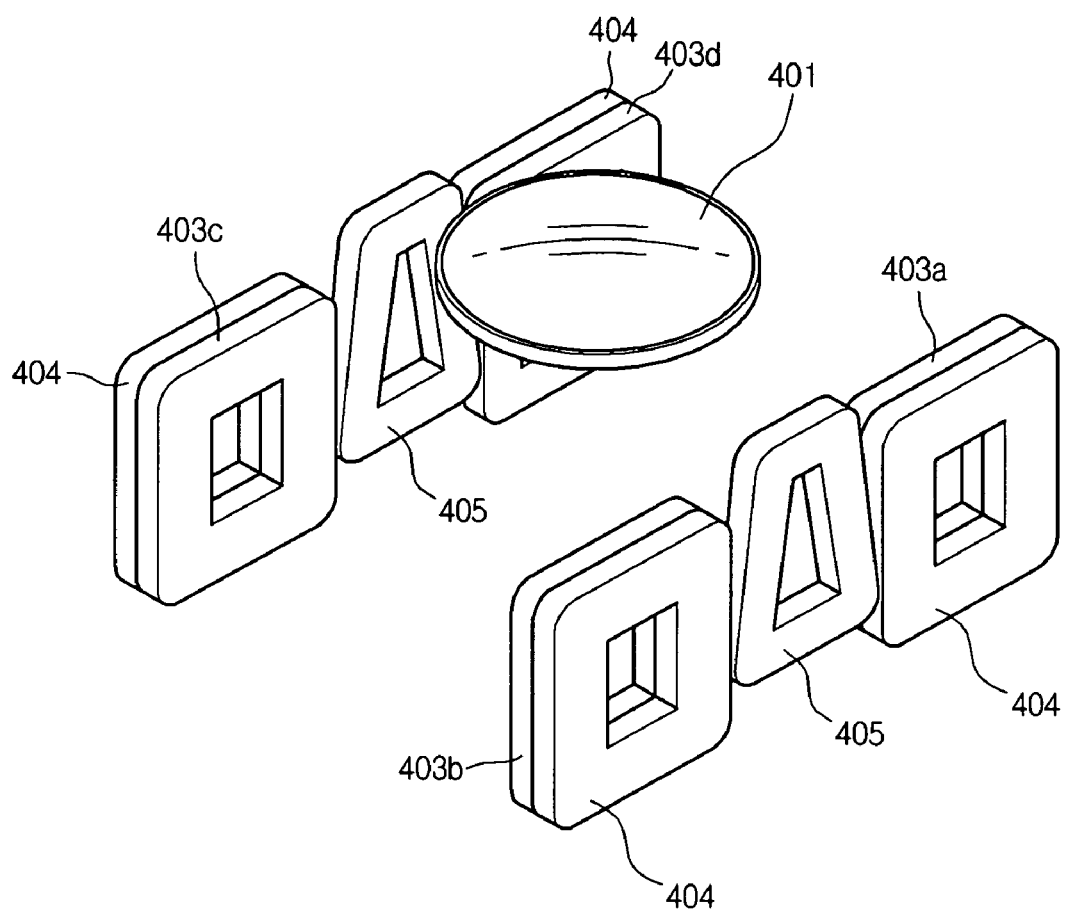
Figure 13:
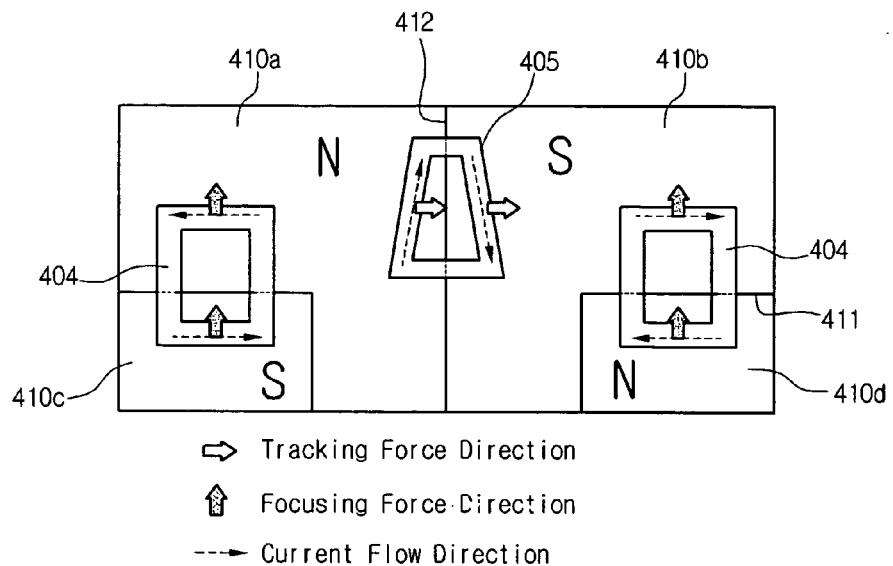

FIGS. 8 and 9 are views illustrating an optical pickup actuator according to the second embodiment of the present invention.

FIG. 8 does not show a lens holder, and shows only an objective lens 301, focusing coils 304, radial coils 303 and tracking coils 305.

In the inventive optical pickup actuator, the focusing coil 304 is first wound and then, the radial coil 303 is wound on the focusing coil 304.

In the same manner as in the first embodiment, the radial coils 303 are positioned to face horizontal boundaries 311 between magnets 310a to 310d disposed at a yoke 307.

FIGS. 10 to 14 are views illustrating an optical pickup actuator according to the third embodiment of the present invention.

The optical pickup actuator includes a lens holder 402 for holding an objective lens 401. The lens holder 402 is supported by a wire suspension 406. The wire suspension 406 not only supports the lens holder 402, but also supplies electric current to activate the optical pickup actuator.

Focusing coils 404, tracking coils 405 and radial coils 403a to 403d are disposed at both side surfaces of the lens holder 402.

The radial coils 403a to 403d are disposed between the focusing coils 404 and the lens holder 402.

The radial coils 403a to 403d can be first wound on coil holders 409, and then the focusing coils 404 can be wound on the coil holders 409 and in front of the radial coils 403a to 403d, so that the radial coils 403a to 403d and the focusing coils 404 can be wound on one coil holders 409.

The focusing coils 404 and the radial coils 403a to 403d are positioned to face horizontal boundaries 411 between magnets having different polarities, and the tracking coil 405 is positioned to face a vertical boundary 412 between magnets having different polarities.

The magnets are comprised of rectangular magnets 410c and 410d disposed at their lower sides, and rectangular magnets 410a and 410b disposed at upper sides of and between the rectangular magnets 410c and 410d. The magnets 410a to 410d are respectively fixed to an inner surface of a yoke 407, which is formed of ferromagnetic substance and disposed adjacently to the lens holder 402.

Figure 14:
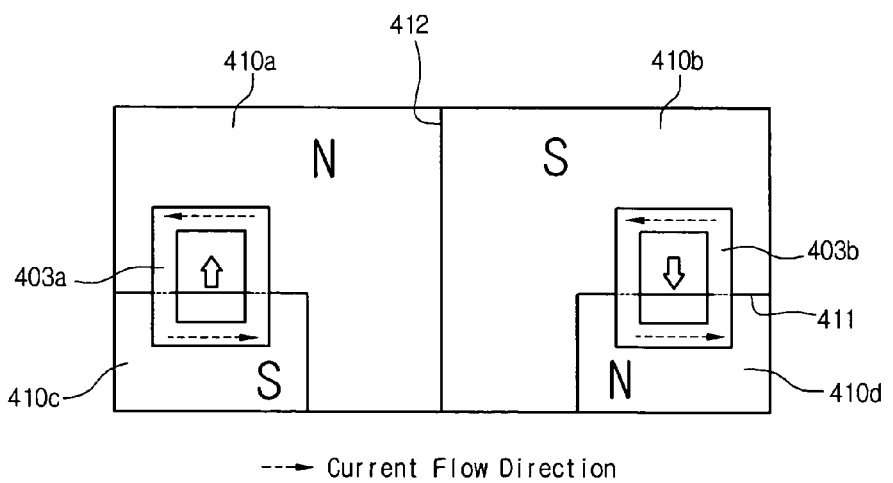

Due to the radial tilting operation of the radial coils 403a to 403d, as shown in FIG. 14, the lens holder 402 is forced downward at one side and upward at the other side.

In other words, the both sides of the lens holder 402 are respectively forced in opposite directions such that the radial coils 403a to 403d can perform the radial tilting operation.

An operation of the optical actuator will be described as follows.

First, when electric current flows through the focusing coil 404, the focusing coil 404 is interacted with a magnetic field generated from the horizontal boundary 411 between the facing magnets and is vertically forced due to the interaction, thereby activating a focusing servo.

When electric current flows through the tracking coil 405, the tracking coil 405 is interacted with a magnetic field generated from the vertical boundary 412 between the facing magnets and is horizontally forced due to the interaction thereby activating a tracking servo.

When electric current flows through the radial coils 403a to 403d, the radial coils 403a to 403d are interacted with the magnetic field generated from the horizontal boundary 411 between the facing magnets and are forced upward and downward due to the interaction, thereby performing the radial tilting operation.

By the parallel connection, the direction of the applied electric current, and the winding direction of the radial coils 403a to 403d, the radial coils 403b and 403c and the radial coils 403a and 403d are forced in different directions, respectively.

For example, in FIG. 14, when the electric current counterclockwisely flows through the radial coils 403a and 403b, the radial coil 403a is forced downward and the radial coil 403b is forced upward due to opposite magnetic poles of the magnets disposed at upper and lower positions of the horizontal boundary 411.

Accordingly, the radial tilting operation of the radial coils 403a to 403d can be smoothly performed.

Figure 15:
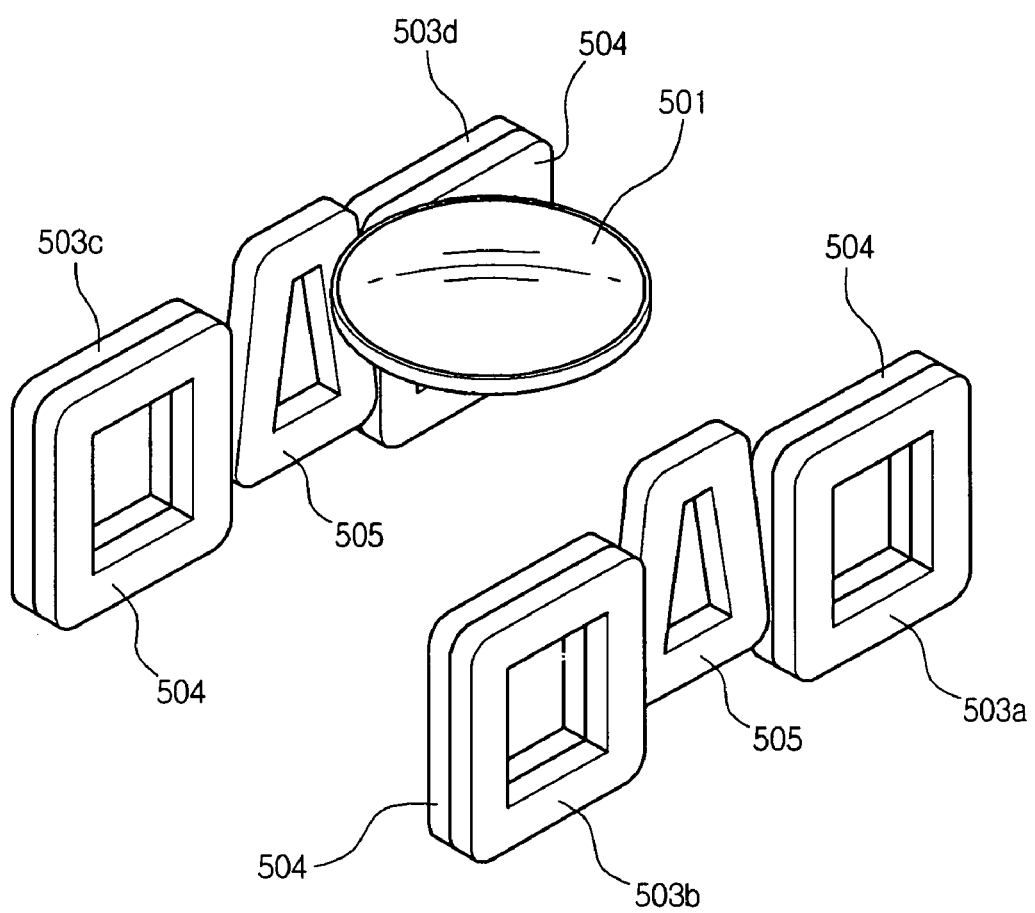
FIGS. 15 and 16 are views illustrating an optical pickup actuator according to the fourth embodiment of the present invention.
Figure 16:
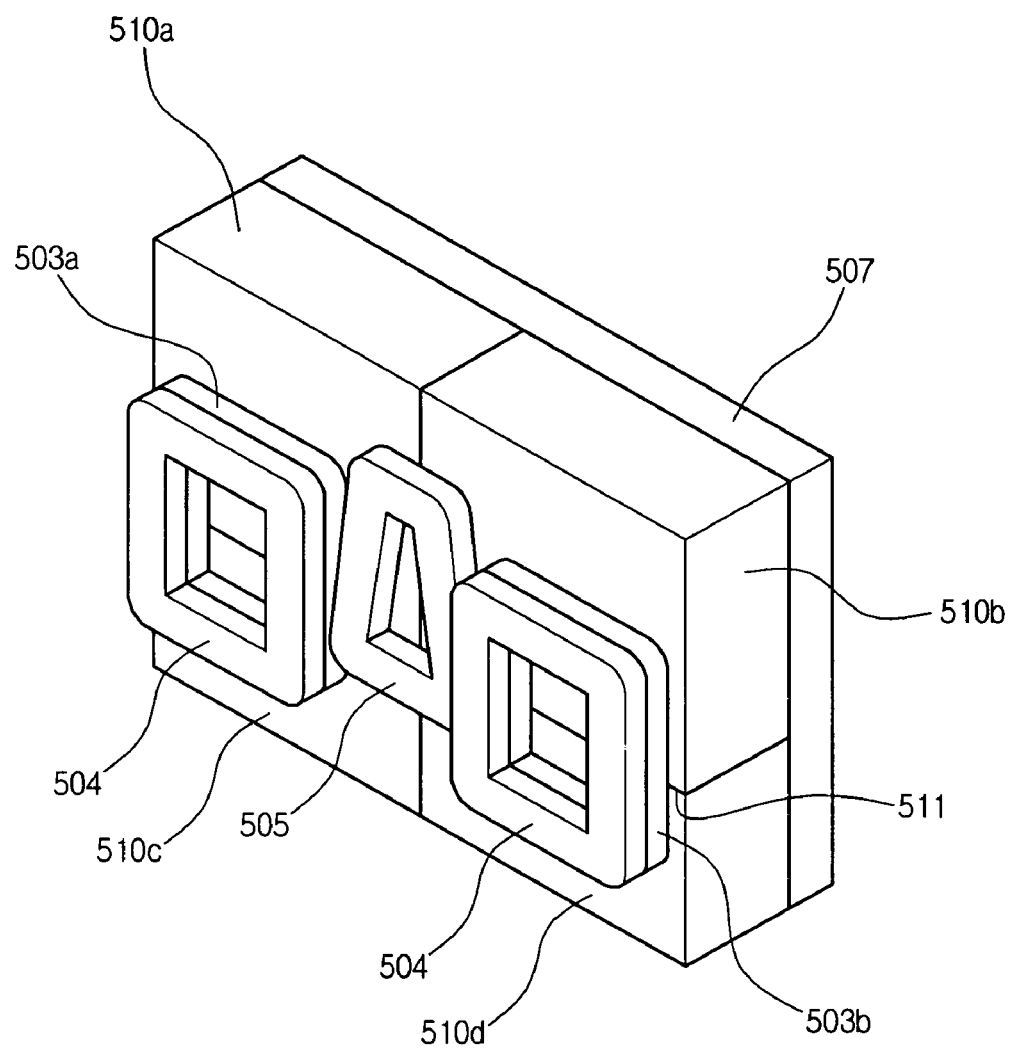
Figure 17:
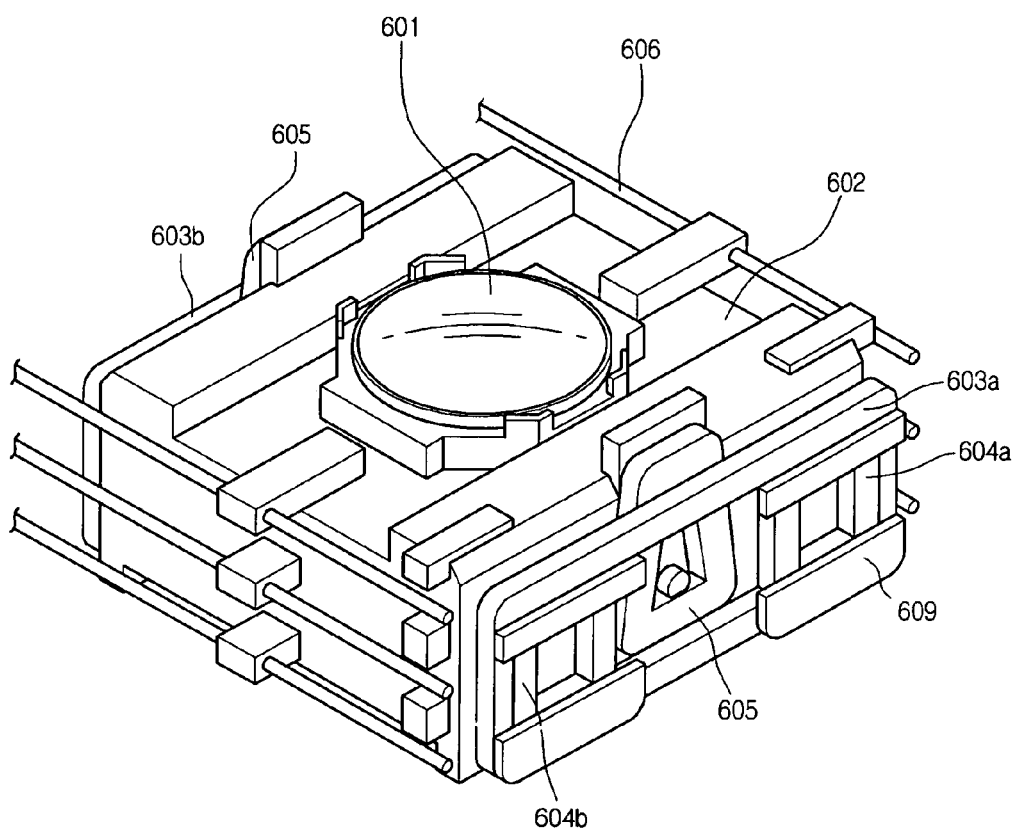
FIGS. 17 to 20 are views illustrating an optical pickup actuator according to the fifth embodiment of the present invention.
Figure 18:
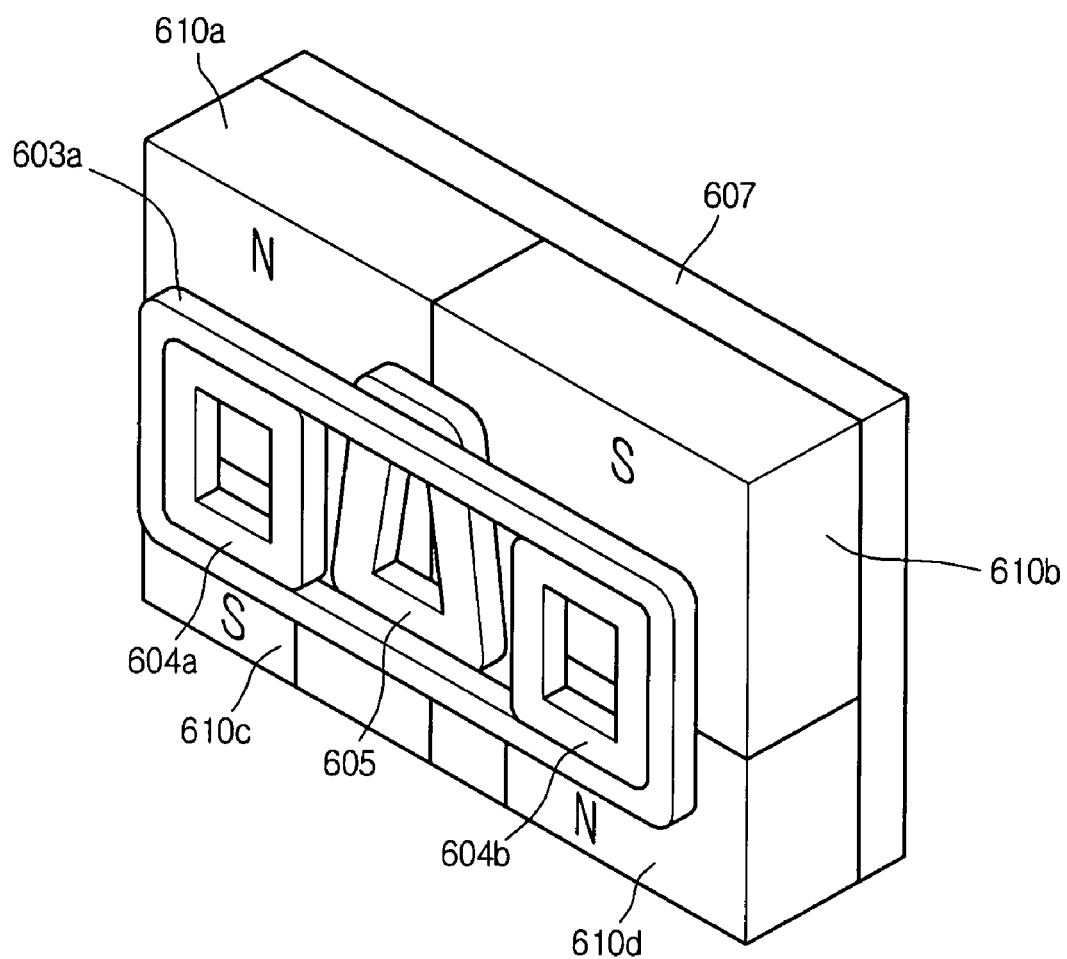
Figure 19:
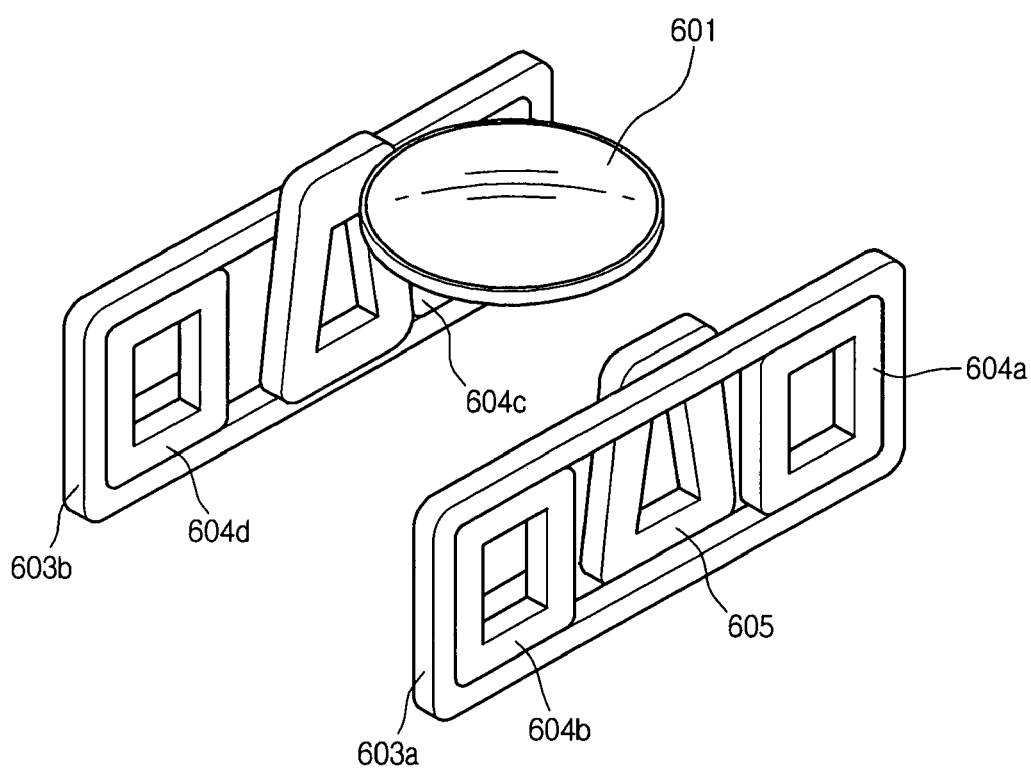

FIGS. 15 and 16 are views illustrating an optical pickup actuator according to the fourth embodiment of the present invention.

FIG. 15 does not show a lens holder, and shows only an objective lens 501, focusing coils 504, radial coils 503a to 503d, and tracking coils 505.

In the inventive optical pickup actuator, the focusing coils 504 are first wound and then, the radial coils 503a to 503d are wound in front of the focusing coils 504.

In other words, the focusing coils 504 are positioned between the lens holder and the radial coils 503a to 503d.

The radial coils 503a to 503d of the fourth embodiment are changed in position in the third embodiment of the present invention.

In the same manner as in the third embodiment, the radial coils 503a to 503d and the focusing coils 504 are positioned to face horizontal boundaries 511 between magnets 510a to 510d disposed at a yoke 507.

FIGS. 17 to 20 are views illustrating an optical pickup actuator according to the fifth embodiment of the present invention.

The optical pickup actuator includes a lens holder 602 for holding an objective lens 601. The lens holder 602 is supported by a wire suspension 606. The wire suspension 606 not only supports the lens holder 602, but also supplies electric current to activate the optical pickup actuator.

Focusing coils 604a to 604d, tracking coils 605, and radial coils 603a and 603b are disposed at both side surfaces of the lens holder 602.

The radial coils 603a and 603b are disposed at circumferences of the focusing coils 604a and 604b and at circumferences of the focusing coils 604c and 604d. Each of the radial coils 603a and 603b forms one loop at both sides of the lens holder 602.

The focusing coils 604a and 604b are first wound on coil holders 609, and then the radial coil 603a is wound as one loop on the circumferences of the focusing coils 604a and 604b.

Similarly, the focusing coils 604c and 604d are first wound on the coil holders 609, and then the radial coil 603b is wound as one loop on the circumferences of the focusing coils 604c and 604d.

The focusing coils 604a to 604d and the radial coils 603a and 603b are positioned to face horizontal boundaries 611 between magnets having different polarities, and the tracking coil 605 is positioned to face a vertical boundary 612 between magnets having different polarities.

The magnets are comprised of rectangular magnets 610c and 610d disposed at their lower sides, and rectangular magnets 610a and 610b disposed at upper sides of and between the rectangular magnets 610c and 610d. The magnets 610a to 610d are respectively fixed to an inner surface of a yoke 407, which is formed of ferromagnetic substance and disposed adjacently to the lens holder 602.

Figure 20:
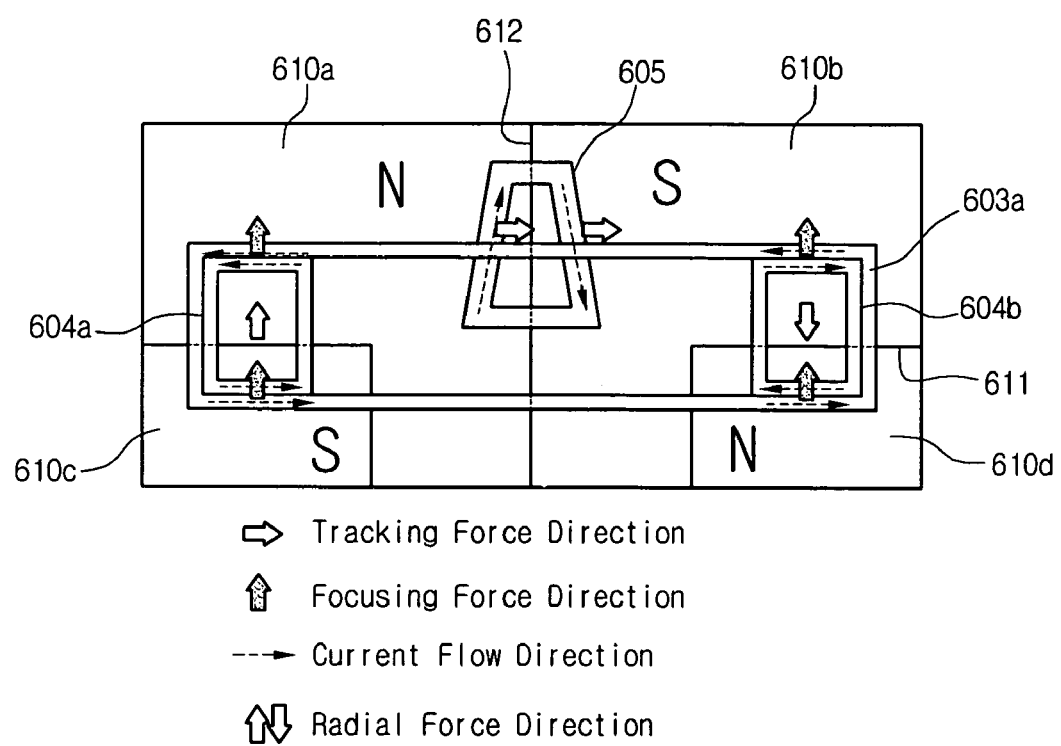

Due to the radial tilting operation of the radial coils 603a and 603b, as shown in FIG. 20, the lens holder 602 is forced downward at one side and upward at the other side.

In other words, the both sides of the lens holder 602 are respectively forced in opposite directions such that the radial coils 603a and 603b can perform the radial tilting operation.

An operation of the optical pickup actuator will be described as follows.

First, when electric current flows through the focusing coils 604a to 604d, the focusing coils 604a to 604d are interacted with magnetic fields generated from the horizontal boundaries 611 between the facing magnets and are vertically forced due to the interaction, thereby activating a focusing servo.

When electric current flows through the tracking coil 605, the tracking coil 605 is interacted with a magnetic field generated from the vertical boundary 612 between the facing magnets and is horizontally forced due to the interaction, thereby activating a tracking servo.

When electric current flows through the radial coils 603a and 603b, the radial coils 603a and 603b are interacted with the magnetic fields generated from the horizontal boundaries 611 between the facing magnets and are forced upward and downward due to the interaction, thereby performing the radial tilting operation.

For example, in FIG. 20, when the electric current counterclockwise flows through the radial coil 603a, the radial coil 603a is forced upward due to opposite magnetic poles of the magnets disposed at upper and lower positions of the horizontal boundary 611.

Accordingly, the radial tilting operation of the radial coil 603a can be smoothly performed.

As described above, the inventive optical pickup actuator has an advantage in that the radial coil is wound together with the focusing coil at a position of the lens holder, thereby simplifying a shape and a manufacture process of the lens holder.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup actuator, comprising:
a lens holder configured to hold an object lens;
a pair of focusing coils operably coupled to the lens holder;
a tracking coil operably coupled to the lens holder;
a pair of radial coils operably coupled to the lens holder, each of the pair of radial coils being wound at a respective coil holder of a pair of coil holders and each of the pair of focusing coils being wound at a respective coil holder of the pair of coil holders, wherein the tracking coil is positioned between the pair of radial coils and the pair of focusing coils respectively wound on the pair of coil holders on a same side of the lens holder; and
a plurality of multipolar magnets supported on a yoke and positioned facing the pair of focusing coils, the tracking coil, and the pair of radial coils.

2. An optical pickup actuator, comprising:
a lens holder configured to hold an objective lens;
a plurality of multipolar magnets positioned adjacent to the lens holder, wherein the plurality of multipolar magnets are supported by a yoke that is separate from the lens holder; and
at least one focusing coil wound on a corresponding coil holder, at least one pair of radial coils, and at least one tracking coil positioned between the at least one pair of radial coils, all operably coupled to the lens holder and positioned on a same side of the lens holder, the at least one focusing coil facing a horizontal boundary between the plurality of multipolar magnets such that the at least one focusing coil generates a vertical force in a direction depending on a direction of an applied electric current, the at least one tracking coil facing a vertical boundary between the plurality of multipolar magnets such that the at least one tracking coil generates a horizontal force in a direction depending on the direction of the applied electric current, and the at least one pair of radial coils facing a horizontal boundary between the plurality of multipolar magnets such that the at least one pair of radial coils is forced upward at a first end thereof and downward at a second end thereof depending on the direction of the applied electric current.

3. The actuator of claim 2, wherein the at least one pair of radial coils comprises first and second pairs of radial coils respectively provided at opposite side surfaces of the lens holder, and wherein electric currents applied to radial coils provided on a same side surface of the lens holder have a same direction.

4. The actuator of claim 2, wherein the at least one pair of radial coils comprises plurality-first and second pairs of radial coils respectively provided at opposite side surfaces of the lens holder, and wherein radial coils provided on a same side surface of the lens holder have different winding directions.

5. An optical pickup actuator, comprising:
a lens holder configured to hold an objective lens;
a focusing coil operably coupled to the lens holder so as to perform a focusing operation;
a pair of radial coils having at least one portion thereof coupled to the focusing coil, wherein the radial coil performs a radial tilting operation;
a tracking coil positioned between the pair of radial coils and operably coupled to the lens holder so as to perform a tracking operation, wherein the focusing coil, the tracking coil and the pair of radial coils are all positioned adjacent to each other on a same side of the lens holder; and
a plurality of multipolar magnets supported by a yoke and arranged so as to face the focusing coil, the tracking coil, and the radial coil, wherein the yoke is separate from the holder.

6. The actuator of claim 5, wherein an outer surface of the focusing coil is adhered to an inner surface of a corresponding radial coil of the pair of radial coils.

7. The actuator of claim 5, wherein an inner surface of the focusing coil is adhered to an outer surface of one of the pair of radial coils.

8. The actuator of claim 5, wherein the focusing coil is adhered to on of the pair of radial coils at corresponding side surfaces thereof.

9. The actuator of claim 5, wherein a portion of an outer surface of the focusing coil is adhered to a portion of an inner surface of a corresponding radial coil of the pair of radial coils.

10. An optical pickup actuator, comprising:
a lens holder configured to hold an objective lens;
focusing coils provided on each of two opposite side surfaces of the lens holder and would on respective coil holders so as to perform a focusing operation based on a direction of an applied electric current;

tracking coils provided on each of the two opposite side surfaces of the lens holder so as to perform a tracking operation based on the direction of the applied electric current;

radial coils provided on each of the two opposite side surfaces of the lens holder, with the tracking coils positioned between two radial coils on each of the two opposite side surfaces of the lens holder so as to perform a radial tilting operation based on the direction of the applied electric current, wherein focusing coils, tracking coils and radial coils are all provided on each of the two opposite side surfaces of the lens holder; and multipolar magnets positioned facing the focusing coils, the tracking coils, and the radial coils positioned on each of the two opposite side surfaces of the lens holder, wherein the multipolar magnets are arranged on a yoke that is separate from the lens holder.

11. The actuator of claim 10, wherein the radial coils face horizontal boundaries between the multipolar magnets.

12. The actuator of claim 10, wherein the radial coils form two loops at each of the two opposite side surfaces of the lens holder.

13. The actuator of claim 2, wherein the focusing coils and the tracking coils are wound on the lens holder, and face a horizontal boundary between the multipolar magnets.

14. The actuator of claim 2, wherein the focusing coils, the tracking coils and the radial coils are wound on the lens holder, and face a horizontal boundary between the multipolar magnets.

15. The actuator of claim 1, wherein the pair of coil holders, pair of radial coils, pair of focusing coils and the tracking coil comprise:

a first tracking coil and a first pair of focusing coils respectively wound on a first pair of radial coils respectively wound on a first pair of coil holders all positioned on a first side of the lens holder; and a second tracking coils and a second pair of focusing coils respectively wound on a second pair of radial coils respectively wound on a second pair of coil holders all positioned on a second side of the lens holder that is opposite the first side of the lens holder.

16. The actuator of claim 15, wherein each of the first pair of focusing coils respectively wound on the first pair of radial coils respectively wound on the first pair of coil holders is positioned at a respective corner of the first side of the lens holder, with the first tracking coil positioned therebetween, and each of the second pair of focusing coils respectively wound on the second pair of radial coils respectively wound on the second pair of coil holders is positioned at a respective corner of the second side of the lens holder, with the second tracking coil positioned therebetween, such that the first and second tracking coils are adjacent to but separated from the first and second focusing coils.

17. The actuator of claim 2, wherein the plurality of multipolar magnets comprises:

first and second magnets having a first polarity; and third and fourth magnets having a second polarity, wherein the first and second magnets are arranged on opposite sides of a horizontal axis of the yoke and on opposite sides of a vertical axis of the yoke, and wherein the third and fourth magnets are arranged on opposite sides of the horizontal axis of the yoke and on opposite sides of the vertical axis of the yoke, such that each of the plurality of magnets abuts magnets having an opposite polarity.

* * * * *